(No Model.)
E. C. MERRYMAN.
BIT BRACE.
No. 273,122. Patented Feb. 27, 1883.
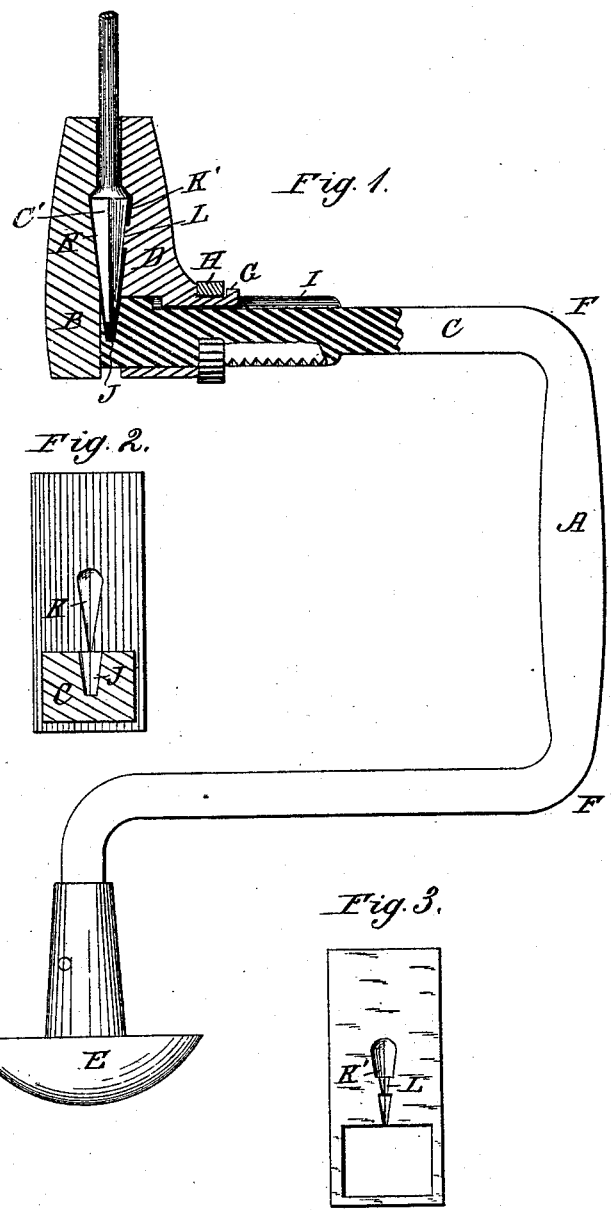

UNITED STATES PATENT OFFICE.

EDWARD C. MERRYMAN, OF NEW FREEDOM, PENNSYLVANIA.

BIT-BRACE.

SPECIFICATION forming part of Letters Patent No. 273,122, dated February 27, 1883.

Application filed December 4, 1882. (No model.)

*To all whom it may concern:*

Be it known that I, EDWARD C. MERRYMAN, of New Freedom, in the county of York and State of Pennsylvania, have invented a new and useful Improvement in Bit-Braces, of which the following is a full, clear, and exact description, reference being had to the annexed drawings, forming part of this specification.

This invention is an improvement on the bit-brace shown and described in Letters Patent No. 208,623, granted to me under date of October 1, 1878, in which patent I have shown a bit-brace having an adjustable jaw adapted to slide on the arm of the brace to clamp the shank of the bit between said jaw and a stationary jaw, which are recessed to receive the angular corners of the shank. The arm is also recessed to allow the end of the shank to pass through it in order to provide room for long shanks.

My present improvement consists of certain details of construction relating to different parts of the brace, as hereinafter described.

In the drawings, Figure 1 is a side elevation of the bit-brace, partly in section; and Figs. 2 and 3 are detail views.

A indicates the body of the brace, having the outer jaw B made in one piece with the arm C instead of being secured thereon, as in my former invention above referred to. The inner adjustable jaw, D, which is adapted to slide on the arm C, must therefore be placed in position by passing it over the body of the brace before the knob E is secured thereon, and to this end it is designed that the corners F shall be gradually curved to facilitate the passage of said jaw. Instead of connecting the threaded sleeve or nut with the movable jaw by an extension at the lower part of the latter arranged outside the sleeve, I form the inner jaw, D, with a feather, G, over which the nut H is placed and confined by a head on the feather. The arm C is provided with a groove, I, for the feather G, and has a thread for the nut cut in the projecting corners of its squared surface. With the above construction the outer or peripheral surface of the nut H is exposed to a perfect grasp by the hand, and is thereby adapted to be operated with greater facility than when partially incased.

In my former invention the arm C is provided with an opening leading entirely through it for the reception of the shank of the bit, and the inner faces of the jaws are provided with semi-pyramidal grooves for the shank of the bit, which grooves have their apexes pointing to the ends of the jaws. With this construction the opening in the arm provides for the longitudinal adjustment of the shank according as the latter is long or short.

Now, in my present invention the arm C is provided with only a recess or seat, J, for the end of the shank C of the bit, instead of an opening, and the semi-pyramidal grooves K K' are made longer with their apexes pointing to the arm C, instead of the ends of the jaws. The greater length of the grooves taken with the recess J provides for the adjustment of longer or shorter shanks, as the case may be. In the groove K', near its longitudinal center, is a raised part, L, having a groove of less depth than the groove K'. This part L is adapted to bind the shank, whether large or small, in close contact with the opposite groove, K, when the inner jaw is properly adjusted. In practice, the seat J in the arm C may possibly be dispensed with; but it has the advantage of steadying the end of the shank, and is therefore preferred. The seat, however, does not weaken the arm so much as the opening, and, taken together with the grooves as now constructed, is adapted to render the device more serviceable.

The jaws of the brace are adapted to serve as a wrench, as in my prior invention.

Having thus described my invention, what I claim, and desire to secure by Letters Patent, is—

1. The combination of the brace-arm and the jaws having semi-pyramidal grooves in their faces, arranged with their apexes pointing to the arm, one of which grooves is provided with a raised part near its longitudinal center, having a groove of less depth than said groove, substantially as shown and described.

2. The combination of the brace-arm, having a seat or recess therein of any desired depth, and the jaws having the semi-pyramidal grooves in their faces, arranged with their apexes toward the arm, and having one of the grooves provided with a raised part, which has a groove less deep than said groove, substantially as shown and described.

EDWARD CLINTON MERRYMAN.

Witnesses:
CHARLES W. McABEE,
JOHN W. HENZE.